United States Patent
Seagle

(10) Patent No.: US 9,378,761 B1
(45) Date of Patent: Jun. 28, 2016

(54) SYSTEM FOR ADJUSTING BIAS OF RELATIVE MAGNETIZATIONS OF FERROMAGNETIC LAYERS IN A MAGNETORESISTIVE SENSOR

(71) Applicant: HGST Netherlands B.V., Amsterdam (NL)

(72) Inventor: David John Seagle, Morgan Hill, CA (US)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 14/693,009

(22) Filed: Apr. 22, 2015

(51) Int. Cl.
*G11B 5/39* (2006.01)
*G11B 5/00* (2006.01)

(52) U.S. Cl.
CPC ............ *G11B 5/3932* (2013.01); *G11B 5/3909* (2013.01); *G11B 5/3912* (2013.01); *G11B 5/3954* (2013.01); *G11B 2005/0018* (2013.01); *G11B 2005/3996* (2013.01)

(58) Field of Classification Search
None
See application file for complete search history.

(56) References Cited

U.S. PATENT DOCUMENTS

| | | |
|---|---|---|
| 7,330,340 B2 | 2/2008 | Gill |
| 7,804,657 B1 | 9/2010 | Hogg et al. |
| 8,179,642 B2 | 5/2012 | Kawamori et al. |
| 8,582,250 B2 | 11/2013 | Qiu et al. |
| 8,724,265 B2 | 5/2014 | Qiu et al. |
| 8,749,926 B1 | 6/2014 | Le et al. |
| 8,786,987 B2 | 7/2014 | Edelman et al. |
| 8,824,107 B2 | 9/2014 | Covington |
| 8,907,666 B2 | 12/2014 | Le et al. |
| 2002/0027752 A1* | 3/2002 | Nakatani ............ G11B 5/3909 360/324.2 |
| 2011/0026169 A1 | 2/2011 | Gill et al. |
| 2013/0082696 A1 | 4/2013 | Le et al. |

OTHER PUBLICATIONS

Chenchen et al., "Magnetization Reversal Process of Tri-Layer Readers for Ultrahigh Density Data Storage", IEEE Transactions on Magnetics, vol. 46, No. 6, Jun. 2010, 1385-1388.

* cited by examiner

*Primary Examiner* — Craig A. Renner
(74) *Attorney, Agent, or Firm* — Thomas R. Berthold

(57) ABSTRACT

A magnetoresistive sensing system includes a current-perpendicular-to-the-plane magnetoresistive (CPP-MR) read head and adjustable biasing circuitry connected to the read head for adjusting the relative magnetizations of one or more of the ferromagnetic layers in the read head. The biasing circuitry generates a bias current in the read head that generates a bias-adjusting magnetic field that acts on one or more of the ferromagnetic layers. For a conventional read head, the bias-adjusting field acts orthogonal to the field from the reference layer to change the angle between the magnetization of the free layer and the magnetization of the reference layer. For a scissoring-type read head, the bias-adjusting field acts parallel to the transverse bias field to change the angle between the magnetizations of the two free layers. This results in an improvement in the sensitivity of the read head to bring the soft error rate (SER) below an acceptable level.

17 Claims, 6 Drawing Sheets

SYSTEM FOR ADJUSTING BIAS OF RELATIVE MAGNETIZATIONS OF FERROMAGNETIC LAYERS IN A MAGNETORESISTIVE SENSOR

BACKGROUND OF THE INVENTION

1. Field of the Invention

The invention relates generally to magnetoresistive (MR) sensors, and more particularly to a system that adjusts the bias of the relative magnetizations (i.e., magnetic moment or magnetization directions or vectors) of the ferromagnetic layers in the sensors.

2. Background of the Invention

One type of conventional MR sensor used as the read head in magnetic recording disk drives is a "spin-valve" sensor based on the giant magnetoresistance (GMR) effect. A GMR spin-valve sensor has a stack of layers that includes two ferromagnetic layers separated by a nonmagnetic electrically conductive spacer layer, which is typically copper (Cu), silver (Ag) or a Cu or Ag alloy. One ferromagnetic layer adjacent the spacer layer has its magnetization direction fixed, such as by being pinned by exchange coupling with an adjacent antiferromagnetic layer, and is referred to as the reference layer. The other ferromagnetic layer adjacent the spacer layer has its magnetization direction free to rotate in the presence of an external magnetic field and is referred to as the free layer. With a sense current applied to the sensor, the rotation of the free-layer magnetization relative to the reference-layer magnetization due to the presence of an external magnetic field is detectable as a change in electrical resistance. If the sense current is directed perpendicularly through the planes of the layers in the sensor stack, the sensor is referred to as a current-perpendicular-to-the-plane (CPP) sensor.

In addition to CPP-GMR read heads, another type of CPP-MR sensor is a magnetic tunnel junction sensor, also called a tunneling MR or TMR sensor, in which the nonmagnetic spacer layer is a very thin nonmagnetic tunnel barrier layer. In a CPP-TMR sensor the current tunneling perpendicularly through the layers depends on the relative orientation of the magnetizations in the two ferromagnetic layers. In a CPP-TMR read head the nonmagnetic spacer layer is formed of an electrically insulating material, such as MgO, $TiO_2$, or $Al_2O_3$.

A type of CPP sensor has been proposed that does not have a ferromagnetic reference layer with a fixed or pinned magnetization direction, but instead has dual ferromagnetic sensing or free layers separated by a nonmagnetic spacer layer. In the absence of an applied magnetic field, the magnetizations of the two free layers are oriented generally orthogonal to one another with parallel magnetization components in the sensing direction of the magnetic field to be detected and antiparallel components in the orthogonal direction. With a sense current applied perpendicularly to the layers in the sensor stack and in the presence of an applied magnetic field in the sensing direction, the two magnetizations rotate in opposite directions, changing their angle relative to one another, which is detectable as a change in electrical resistance. Because of this type of behavior of the magnetizations of the two free layers, this type of CPP sensor is often referred to as a "scissoring-type" of CPP sensor. If a CPP-GMR scissoring-type sensor is desired the nonmagnetic spacer layer is an electrically conducting metal or metal alloy. If a CPP-TMR scissoring-type sensor is desired the spacer layer is an electrically insulating material. In a scissoring-type CPP-MR sensor, a "hard-bias" layer of ferromagnetic material located at the back edge of the sensor (opposite the air-bearing surface) applies an approximately fixed, transverse magnetic "bias" field to the sensor. Its purpose is to bias the magnetizations of the two free layers so that they are approximately orthogonal to one another in the quiescent state, i.e., in the absence of an applied magnetic field. Without the hard bias layer, the magnetization directions of the two free layers would tend to be oriented antiparallel to one another. This tendency to be oriented antiparallel results from strong magnetostatic interaction between the two free layers once they have been patterned to sensor dimensions, but may also be the result of exchange coupling between the magnetic layers through the spacer layer. A scissoring-type of CPP-MR sensor is described in U.S. Pat. No. 7,035,062 B2; U.S. Pat. No. 8,670,217 B1 and U.S. Pat. No. 8,015,694 B2.

In both conventional and scissoring-type MR sensors, as the sensor size decreases with the demand for increased data density, the effect of thermomagnetic noise increases, which increases the soft error rate (SER) in the readback data signal. It is thus necessary that the sensors be manufactured with precise dimensions and magnetic properties. However, it is difficult to manufacture large volumes of sensors with identical dimensions and magnetic properties, which means that there may be a wide variation in SER among the sensors.

What is needed is a system that can adjust the bias of the ferromagnetic layers' magnetizations relative to one another after the sensors have been manufactured and installed in the disk drives, so that each sensor will have an acceptable SER.

SUMMARY OF THE INVENTION

Embodiments of the invention relate to a magnetoresistive sensing system that includes a current-perpendicular-to-the-plane magnetoresistive (CPP-MR) read head and adjustable biasing circuitry connected to the read head for adjusting the relative magnetizations of one or more of the ferromagnetic layers in the read head. The read head may be a conventional read head with a free and reference ferromagnetic layer or a scissoring-type read head with two free ferromagnetic layers. After the read heads have been manufactured and the sliders that support the read heads installed in the disk drive, certain data tracks are written with a special predetermined pattern and then read back by the read heads. The readback data is detected to measure the soft error rate (SER) for each read head, using well-known techniques. If the measured SER is greater than an acceptable value for a read head, a voltage bias source in the adjustable biasing circuitry is set to a specific value. The biasing circuitry generates a bias current in the read head that generates a bias-adjusting magnetic field that acts on one or more of the ferromagnetic layers to change the relative magnetizations (i.e., magnetic moments or magnetization directions or vectors) of the ferromagnetic layers. This results in an improvement in the sensitivity of the read head to thus bring the SER below an acceptable level. In the case of a conventional read head, the bias-adjusting field acts orthogonal to the field from the reference or pinned ferromagnetic layer to change the angle between the magnetization of the free layer and the magnetization of the reference layer. In the case of a scissoring-type read head, the bias-adjusting field acts parallel to the transverse bias field to increase or decrease the total transverse bias field and thus change the angle between the magnetizations of the two free layers.

For a fuller understanding of the nature and advantages of the present invention, reference should be made to the following detailed description taken together with the accompanying figures.

DETAILED DESCRIPTION OF THE INVENTION

Figure 1:
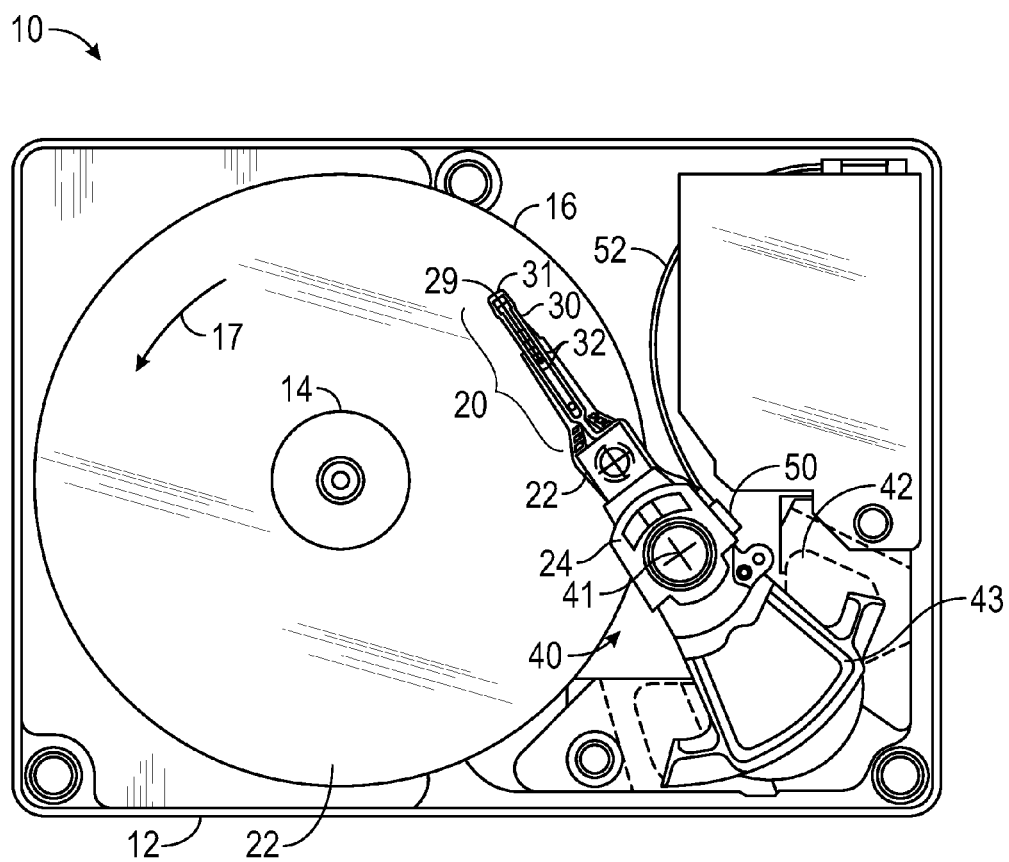
FIG. 1 is a schematic top view of a head/disk assembly (HDA) of a hard disk drive (HDD) that may include embodiments of the invention.

The disk drive 10 includes a rigid base 12 supporting a spindle 14 that supports a stack of disks, including top disk 16. The spindle 14 is rotated by a spindle motor (not shown) for rotating the disks in the direction shown by curved arrow 17. Disk drive 10 also includes a rotary actuator assembly 40 rotationally mounted to the base 12 at a pivot point 41. The actuator assembly 40 is a voice coil motor (VCM) actuator that includes a magnet assembly 42 fixed to base 12 and a voice coil 43. When energized by control circuitry (not shown) the voice coil 43 moves and thereby rotates E-block 24 with attached arms 22 and load beam assemblies 20 to position the read/write heads 29 to the data tracks on the disks. Each read/write head is located on the trailing surface of an air-bearing slider 31. Each load beam assembly 20 has an integrated lead suspension (ILS) 30 with an array of electrically conductive lines or traces 32 that connect to a read/write head 29 on slider 31. The traces 32 connect at one end to the read/write head 29 and at the other end through a short flex cable to a read amplifier/write driver 50 (preamp), which is typically implemented as an integrated circuit, secured to a side of the E-block 24. Each read/write head 29 includes an inductive write head (not shown) and a magnetoresistive read head (not shown). The preamp 50 receives write data input signals from the disk drive's system-on-a-chip (SOC) (not shown) that is typically located on the backside of base 12. The SOC is connected to preamp 50 by a flex cable 52 and through its electronic packaging, printed circuit board, and flex connector (not shown). While only one disk surface and associated head is depicted in FIG. 1, there are typically multiple disks and associated heads/load beam assemblies.

Figure 2:
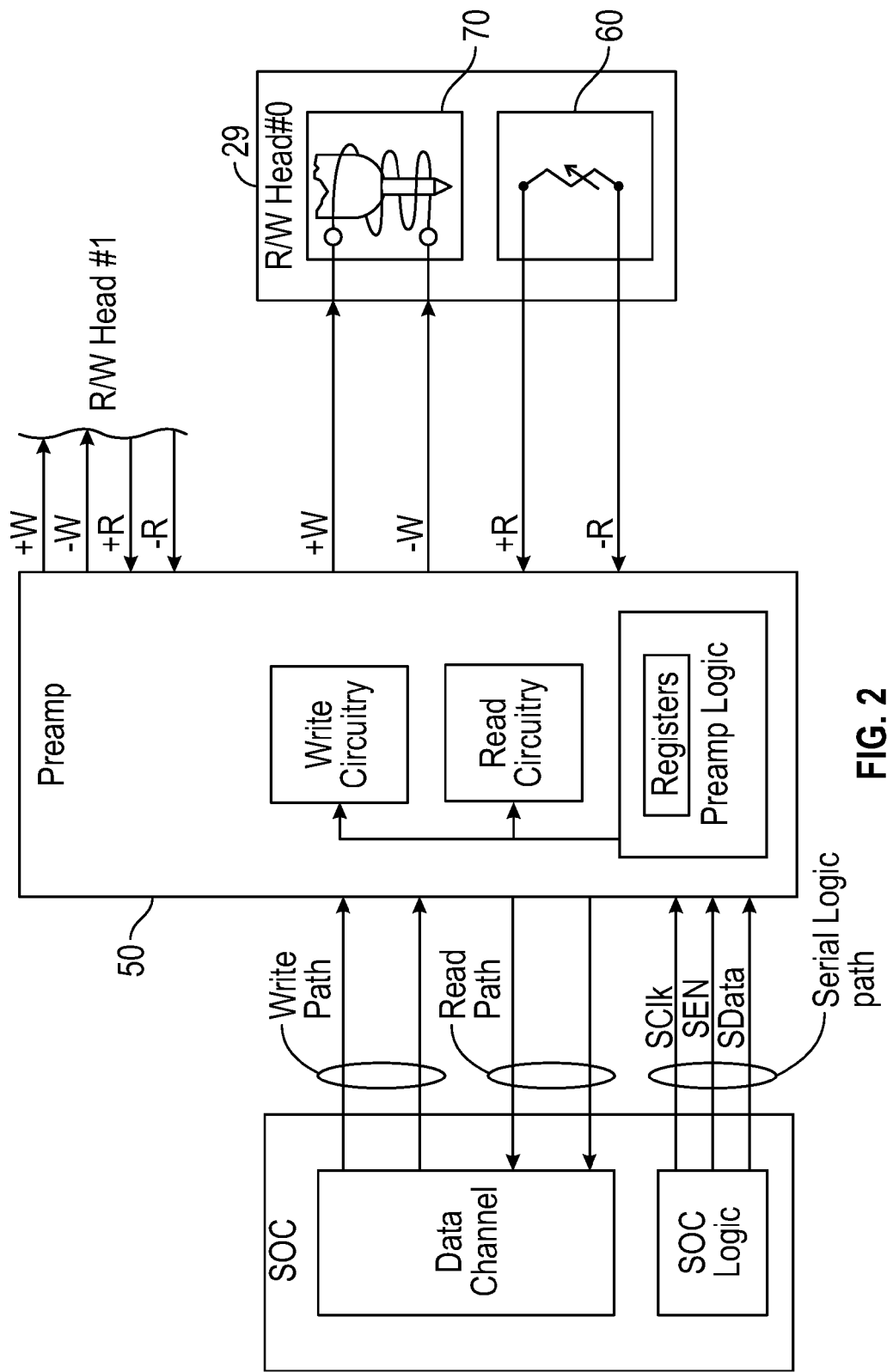
FIG. 2 is a highly schematic block diagram showing the connection of the system-on-a-chip (SOC) to the preamplifier and its connection to one read/write head in a HDD that may include embodiments of the invention.

FIG. 2 is a highly schematic block diagram showing the connection of the SOC to the preamp 50 and its connection to one read/write head 29 (R/W Head #0). The R/W head 29 includes magnetoresistive read head 60 and inductive write head 70. The preamp 50 typically includes multiple ports for controlling multiple R/W heads, as depicted by its connection to a second read/write head (R/W Head #1). The SOC includes a Data Channel with a read path that includes two lines and a write path that includes two lines. The read and write paths form a transmission line between the SOC and the preamp 50. The transmission line is typically formed on a flex cable. The SOC also includes SOC Logic Circuitry connected to a common serial logic path on the flex cable for sending commands to Preamp Logic circuitry in the preamp 50. The serial logic path includes a clock (SClk) line, a serial enable (SEN) line and a serial command or data (SData) line. The commands are used to set Registers in the preamp 50 with values for parameters that control the functions of the preamp 50. The preamp 50 includes Write Circuitry that includes a write driver for sending write pulses to the write head 70, and Read Circuitry that includes a read amplifier for amplifying the readback data from the read head 60. The preamp 50 is connected to the read/write (R/W) head 29 by a short flex cable and the ILS.

Figure 3:
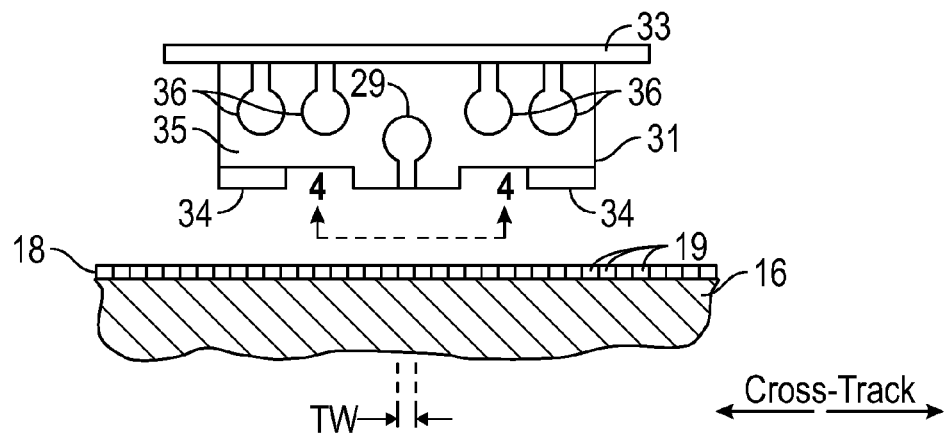
FIG. 3 is an enlarged end view of the slider and a section of the disk in a HDD that may include embodiments of the invention.

FIG. 3 is an enlarged end view of the slider 31 and a section of the disk 16. The slider 31 is attached to a flexure 33 that is attached to ILS 30 and has an air-bearing surface (ABS) 34 facing the disk 16 and a trailing surface 35 generally perpendicular to the ABS. The ABS 34 causes the airflow from the rotating disk 16 to generate a bearing of air that supports the slider 31 in very close proximity to or near contact with the surface of disk 16. The read/write head 29 is formed on the trailing surface 35 and is connected to the disk drive preamp 50 by electrical connection to terminal pads 36 on the trailing surface 35. As shown in the sectional view of FIG. 3, the disk 16 is shown with recording layer 18 having data tracks 19. The data tracks 19 have a track width TW in the cross-track direction.

Figure 4:
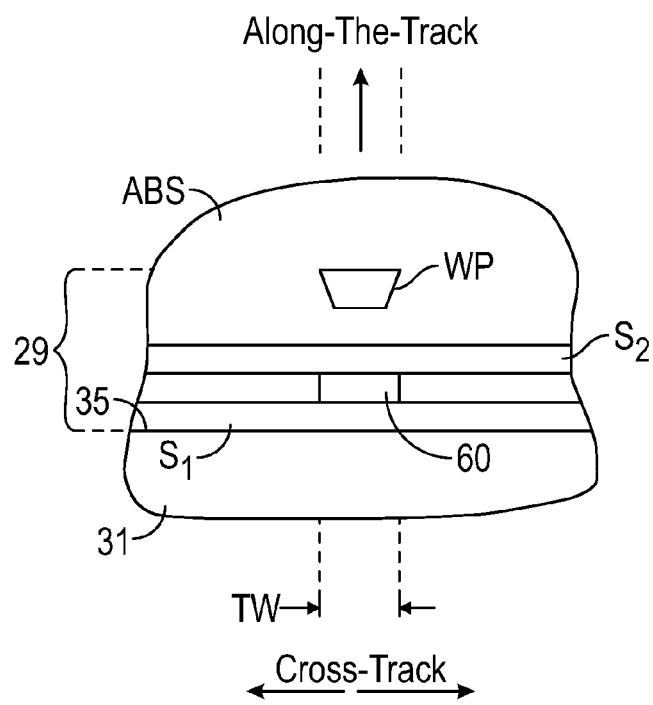
FIG. 4 is a view in the direction 4-4 of FIG. 3 and shows the ends of read/write head as viewed from the disk.

FIG. 4 is a view in the direction 4-4 of FIG. 3 and shows the ends of read/write head 29 as viewed from the disk 16. The read/write head 29 is a series of thin films deposited and lithographically patterned on the trailing surface 35 of slider 31. The write head includes a perpendicular magnetic write pole (WP) and may also include trailing and/or side shields (not shown). The CPP MR sensor or read head 60 is located between two magnetic shields S1 and S2. The shields S1, S2 are formed of magnetically permeable material, typically a NiFe alloy, and may also be electrically conductive so they can function as the electrical leads to the read head 60. The shields function to shield the read head 60 from recorded data bits that are neighboring the data bit being read. Separate electrical leads may also be used, in which case the read head 60 is formed in contact with layers of electrically conducting lead material, such as ruthenium, tantalum, gold, or copper, that are in contact with the shields S1, S2. FIG. 4 is not to scale because of the difficulty in showing very small dimensions. Typically each shield S1, S2 is several microns thick in the along-the-track direction, as compared to the total thickness of the read head 60 in the along-the-track direction, which may be in the range of 20 to 40 nm.

In embodiments of this invention the MR read head 60 is a current-perpendicular-to-the-plane (CPP) read head that may be a conventional read head with a free and reference ferromagnetic layer or a scissoring-type read head with two free ferromagnetic layers. Embodiments of the invention include adjustable biasing circuitry connected to the read heads. After the read heads have been manufactured and the sliders installed in the disk drive, certain data tracks are written with a special predetermined pattern and then read back by the read heads. The readback data is detected to measure the soft error rate (SER) for each read head, using well-known techniques.

If the measured SER is greater than an acceptable value for a read head, a voltage bias source in the adjustable biasing circuitry is set to a specific value. The biasing circuitry generates a bias current in the read head that generates a bias-adjusting magnetic field that acts on one or more of the ferromagnetic layers to change the relative magnetizations (i.e., magnetic moments or magnetization directions or vectors) of the ferromagnetic layers. This results in an improvement in the sensitivity of the read head to thus bring the SER below an acceptable level.

Figure 5A:
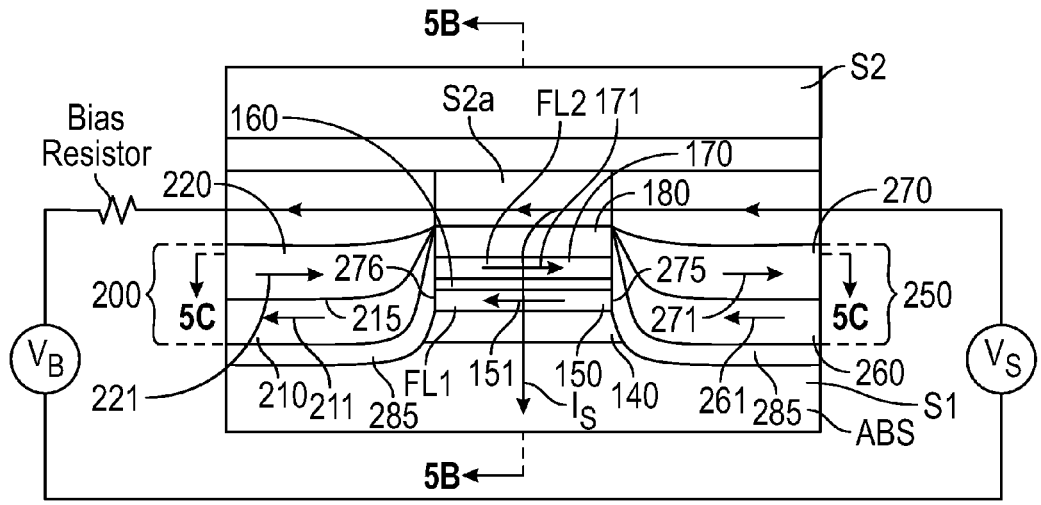
FIG. 5A is an enlarged sectional view facing the ABS of a scissoring-type read head with longitudinal biasing layers for the free ferromagnetic layers according to an embodiment of the invention.
Figure 5B:
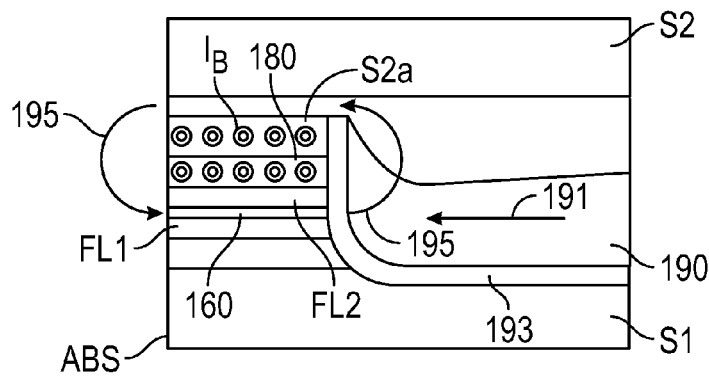
FIG. 5B is a sectional view along the plane 5B-5B in FIG. 5A and shows the ABS as a plane normal to the paper.
Figure 5C:
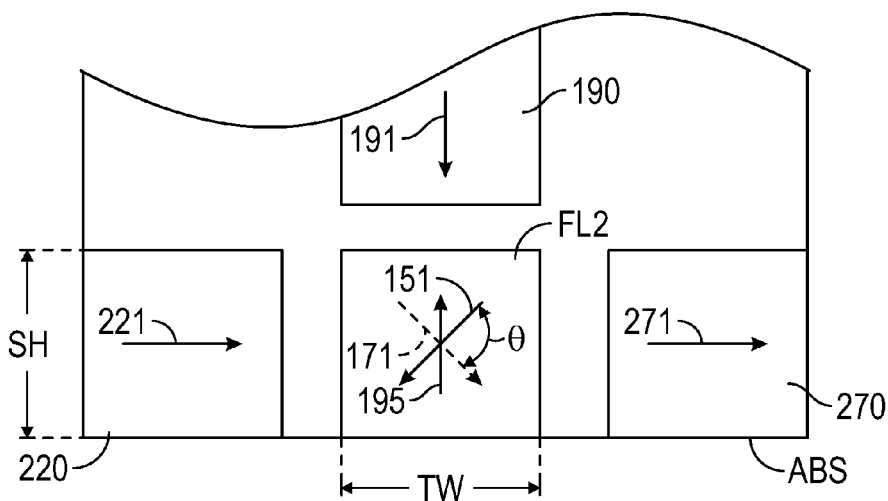
FIG. 5C is a view along the plane 5C-5C in FIG. 5A with the ABS as a plane normal to the paper and shows the track-width (TW) and stripe height (SH) dimensions of the sensor.

FIGS. 5A-5C are views of a scissoring-type CPP GMR or TMR read head according to an embodiment of the invention. FIG. 5A is an enlarged sectional view facing the ABS of a scissoring-type read head with longitudinal biasing layers for the free ferromagnetic layers FL1 and FL2. In the embodiment shown in FIG. 5A the longitudinal biasing is provided by exchange-coupled soft side shields like that described in pending application Ser. No. 14/085,593, which is assigned to the same assignee as this application. Alternatively, however, hard magnetic layers may provide the longitudinal biasing of FL1 and FL2. The sensor comprises a stack of layers, including dual sensing or free layers, formed between the two magnetic shield layers S1, S2. S1 and S2 are typically electroplated NiFe alloy films. The sensor layers are a first ferromagnetic free or sensing layer (FL1) 150 having a magnetization 151 and a second ferromagnetic free or sensing layer (FL2) 170 having a magnetization 171.

FL1 and FL2 are typically formed of conventional ferromagnetic materials like crystalline CoFe or NiFe alloys, or a multilayer of these materials, such as a CoFe/NiFe bilayer. Instead of these conventional ferromagnetic materials, FL1 and FL2 may be formed of or comprise a ferromagnetic Heusler alloy, some of which are known to exhibit high spin-polarization in their bulk form. Examples of Heusler alloys include but are not limited to the full Heusler alloys $Co_2MnX$ (where X is one or more of Al, Sb, Si, Sn, Ga, or Ge). Examples also include but are not limited to the half Heusler alloys NiMnSb, PtMnSb, and $Co_2Fe_xCr_{(1-x)}Al$ (where x is between 0 and 1).

FL1 and FL2 comprise self-referenced free layers, and hence no pinned or reference layers with fixed magnetizations are required, unlike in conventional CPP MR sensors. FL1 and FL2 have their magnetizations 151, 171, respectively, oriented in-plane and preferably generally orthogonal to one another in the absence of an applied magnetic field. While the magnetizations 151, 171 in the quiescent state (the absence of an applied magnetic field) are preferably oriented generally orthogonal, i.e., between about 70 and 90 degrees to each other, they may be oriented by less than generally orthogonal, depending on the bias point at which the sensor is operated. FL1 and FL2 are separated by a nonmagnetic spacer layer 160. In other embodiments spacer layer 160 is a nonmagnetic electrically conductive metal or metal alloy, like Cu, Au, Ag, Ru, Rh, Cr and their alloys, if the sensor is a CPP GMR sensor, and a nonmagnetic insulating material, like $TiO_2$, MgO or $Al_2O_3$, if the sensor is a CPP TMR sensor.

Located between the lower shield layer S1 and the FL1 is an underlayer or seed layer 140. The seed layer 140 may be a single layer or multiple layers of different materials. Located between FL2 and the upper shield layer S2 is a nonmagnetic electrically conducting capping layer 180. An electrical lead layer S2a is located on capping layer 180 and serves as the electrical lead for the biasing current. Lead layer S2a may be formed of a soft magnetic material like that used for shields S1 and S2. The bottom shield S1 and S2a are used as leads, with S1 serving as the substrate for the deposition of the sensor stack. The underlayer or seed layer 140 is typically one or more layers of NiFeCr, NiFe, Ta, Cu or Ru. The capping layer 180 provides corrosion protection and is typically formed of single layers, like Ru or Ta, or multiple layers of different materials, such as a Cu/Ru/Ta trilayer.

FIG. 5B is a sectional view along the plane 5B-5B in FIG. 5A and shows the ABS as a plane normal to the paper. FIG. 5C is a view along the plane 5C-5C in FIG. 5A with the ABS as a plane normal to the paper and shows the trackwidth (TW) and stripe height (SH) dimensions of the sensor. FIG. 5C shows the in-plane generally orthogonal relative orientation of magnetizations 151, 171, with magnetization 171 being depicted as a dashed arrow because it is the magnetization of underlying FL1 which is not visible in FIG. 5C. As can be seen from FIG. 5C, in the absence of an applied magnetic field, the magnetizations 151, 171 have parallel components in the sensing direction of the magnetic field to be detected (perpendicular to the ABS) and antiparallel components in the orthogonal direction (parallel to the ABS).

FIGS. 5B and 5C show a hard magnetic bias layer 190 recessed from the ABS. The hard bias layer 190 may be formed of a hard magnetic material like CoPtCr and is magnetized in-plane in the direction 191. Hard magnetic transverse bias layer 190 is separated from FL1, spacer layer 160 and FL2 by insulating layer 193 and has a magnetization 191 that provides a transverse magnetic field that stabilizes or biases the FL1, FL2 magnetizations 151, 171 in the absence of an applied magnetic field so that they make a non-zero angle θ relative to one another, preferably a generally orthogonal relative orientation, by rotating them away from what would otherwise be an antiparallel orientation. Referring to FIG. 5C, the detected signal field is generally perpendicular to the ABS and is aligned generally collinearly with the transverse bias field of magnetization 191. In the presence of an external applied magnetic field in the range of interest, i.e., magnetic fields from recorded data on the disk 16, the magnetizations 151 and 171 of FL1 and FL2, respectively, will rotate in opposite directions, changing the angle θ. Thus when a sense current $I_S$ is applied from S2a perpendicularly through the stack to bottom shield S1, the magnetic fields from the recorded data on the disk will cause rotation of the magnetizations 151, 171 in opposite directions relative to one another, which is detectable as a change in electrical resistance.

FIG. 5A also shows exchange-coupled soft side shields 200, 250. The soft side shields 200, 250 prevent reading of recorded bits in tracks adjacent the track being read and also bias the FL1 and FL2 magnetizations 151, 171 longitudinally so they have a preferred direction in the quiescent state. FL1, nonmagnetic spacer layer 160, and FL2 are separate from exchange-coupled soft-side shields 200, 250 at the side edges 275, 276 that essentially define the sensor TW. An insulating layer 285, such as alumina ($Al_2O_3$), at the side edges 275, 276 electrically insulates FL1 and FL2 from the side shields 200, 250.

In the exchange-coupled side shield 200, which is identical to side shield 250, soft magnetic layers 210, 220 are separated by a nonmagnetic antiparallel-coupling (APC) layer 215, typically a 0.5-1 nm thick layer of Ru or Cr. The thickness of the APC layer 215 is chosen to provide adequate antiferromagnetic exchange coupling, resulting in the magnetizations 211, 221 of soft magnetic layers 210, 220 being oriented substantially antiparallel.

Thus layers 210, 220 (and also layers 260, 270 in exchange-coupled soft side shield 250) are preferably an alloy comprising Ni and Fe with permeability (μ) preferably greater than 10. Any of the known materials suitable for use in the along-the-track shields S1 and S2 may be used for layers

210, 220. Specific compositions include $NiFe_x$, where x is between 1 and 25, and $(NiFe_x)Mo_y$ or $(NiFe_x)Cr_y$, where y is between 1 and 8, where the subscripts are in atomic percent.

As shown in FIGS. 5A and 5C, layers 220, 270 are aligned generally vertically on the substrate (S1) with the side edges of FL2, and layers 210, 260 are aligned generally vertically on the substrate with the side edges of FL1. Thus the magnetizations 221 of layer 220 and 271 of layer 270 provide a longitudinal magnetic bias field to the magnetization 171 of FL2. Similarly, the magnetizations 211 of layer 210 and 261 of layer 260 provide a longitudinal magnetic bias field to the magnetization 151 of FL1. This longitudinal biasing of FL1 and FL2 is in addition to the orthogonal biasing provided by hard bias layer 190 with magnetization 191. The longitudinal biasing provided by the exchange coupled soft side shields 200, 250 thus assures that the magnetization 171 of FL2 points to the right in FIG. 5C and that the magnetization 151 of FL1 points to the left in FIG. 5C. In addition to providing longitudinal biasing for FL1 and F12, the exchange-coupled soft side shields 200, 250 also shield the sensor free layers FL1, FL2 from recorded bits in adjacent tracks, i.e., tracks on either side of the TW region of the sensor.

FIG. 5A shows the sensing circuitry connected between the sensor and the sense voltage source $V_S$. The sense current $I_S$ passes perpendicularly through FL2, spacer layer 160 and FL1. The applied magnetic fields from recorded data on the disk changes the angle θ, which the sensing circuitry in the preamp detects as changes in electrical resistance. FIG. 5A also shows the biasing circuitry connected between the sensor and the bias voltage source $V_B$. The biasing circuitry is connected to electrical lead S2a and includes a bias resistor, preferably formed on the trailing surface of the slider. The bias current $I_B$ is directed through S2a and side shield layers 220, 270 in a direction substantially parallel to the ABS and orthogonal to the magnetization 191 of transverse bias layer 190. The bias current thus generates a transverse bias-adjusting magnetic field 195, as shown in FIGS. 5B-5C. The bias-adjusting field 195 thus adjusts the relative orientation of magnetizations 151, 171 of FL1 and FL2 in the quiescent state, i.e., the absence of an applied magnetic field from recorded data on the disk. This changes the sensitivity of the sensor.

Figure 6:
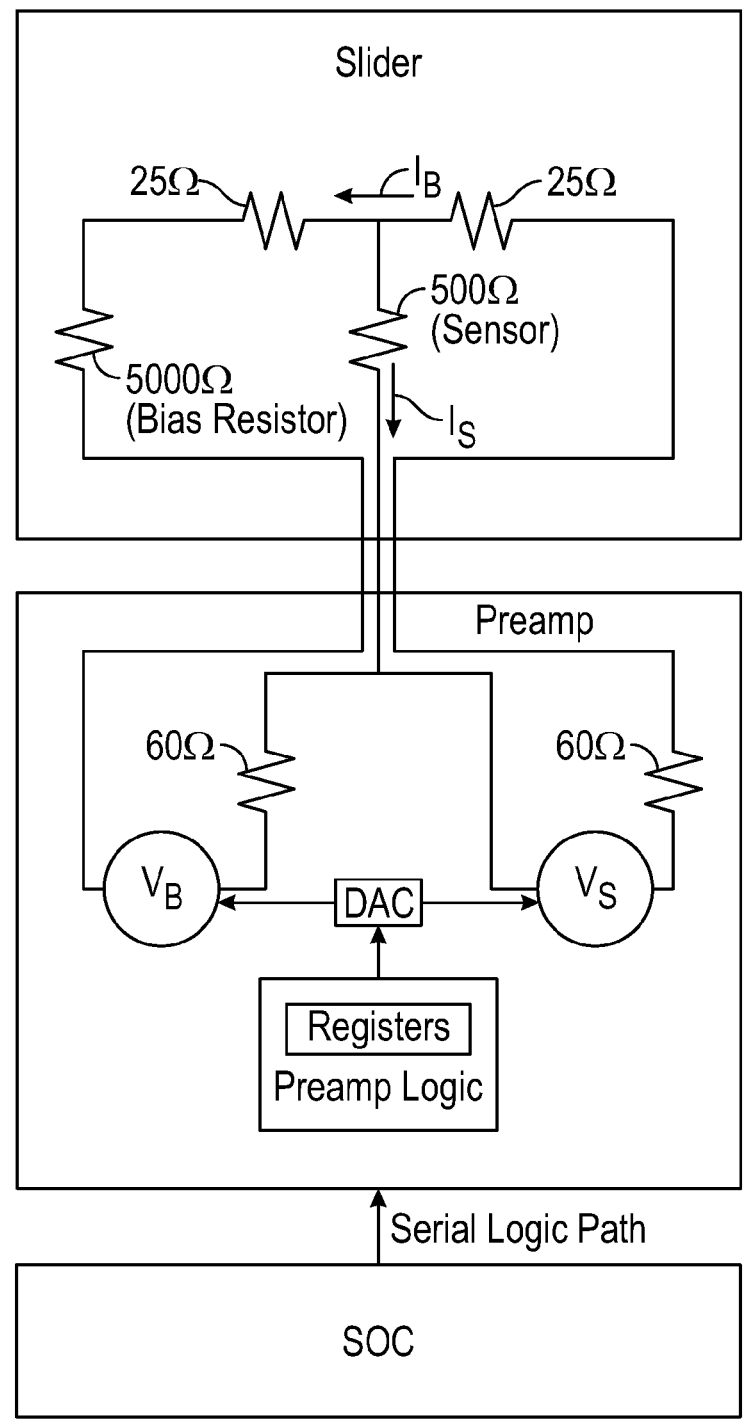
FIG. 6 is a block diagram showing the connection of the sensing and biasing circuitry between the preamp and the slider, and the serial logic path between the disk drive's SOC and the preamp according to an embodiment of the invention.

FIG. 6 is a block diagram showing the connection of the sensing and biasing circuitry between the preamp and the slider, and the Serial Logic Path between the disk drive's SOC and the preamp. The bias voltage source and sense voltage source are adjustable and located in the preamp. The SOC sends digital values representative of the desired sense and bias voltages on the Serial Logic Path to registers in the preamp. A digital-to-analog converter (DAC) converts the values in the registers to set the values of $V_B$ and $V_S$. After the SER has been measured for a sensor and it is determined that the SER is too high, the SOC selects a digital value of $V_B$ that will generate the correct value of bias-adjusting field 195 to increase or decrease the total transverse bias field and thereby change the angle θ in the quiescent state. The digital value of $V_B$ is selected from previous calibration methods. This will alter the sensitivity of the sensor and reduce the SER.

The example illustrated in FIG. 6 is for a TMR sensor with TW=16 nm, SH=16 nm, a S1-S2 spacing of 11 nm, and a S2a electrical lead of 4 nm thick NiFe. The typical resistance across FL1, spacer layer and FL2 is about 500Ω and the resistance of the bias resistor in the biasing circuitry is about 5000Ω. The electrical lead S2a has a resistance of about 50Ω (which is split between the biasing circuitry and the sense circuitry). The 60Ω resistors represent conventional source impedance internal to the preamp to match the characteristic impedance of the transmission line. The nominal value of $V_S$ is about 100 mV and the difference ($V_B$–$V_S$) is about +/–1 V. The bias current $I_B$ is about +/–200 μA, which results in a bias-adjusting field (195 in FIG. 5C) range of about +/–125 Oe about the nominal transverse bias field (the field provided by magnetization 191 of transverse bias ferromagnetic layer 190 in FIG. 5C).

Figure 7A:
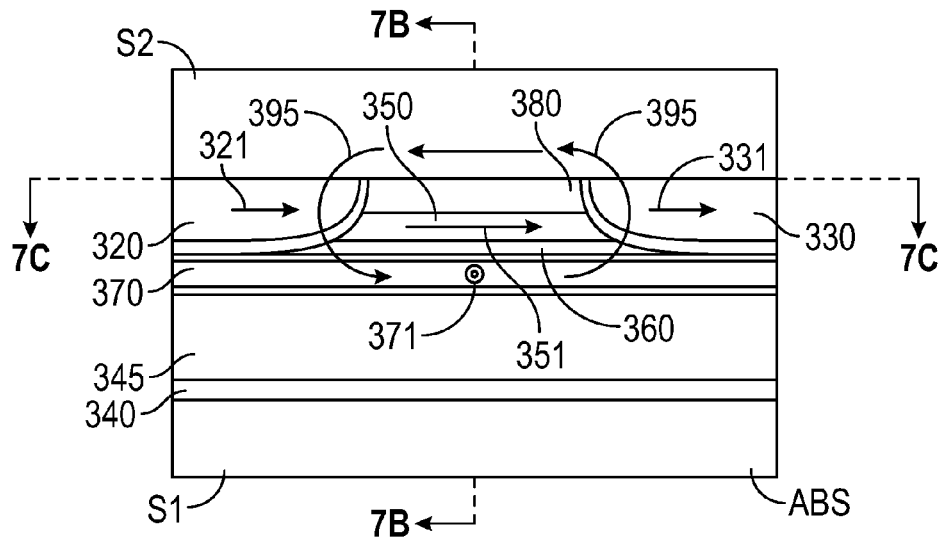
FIG. 7A is an enlarged sectional view facing the ABS of a conventional CPP GMR or TMR read head in an embodiment of the invention.
Figure 7B:
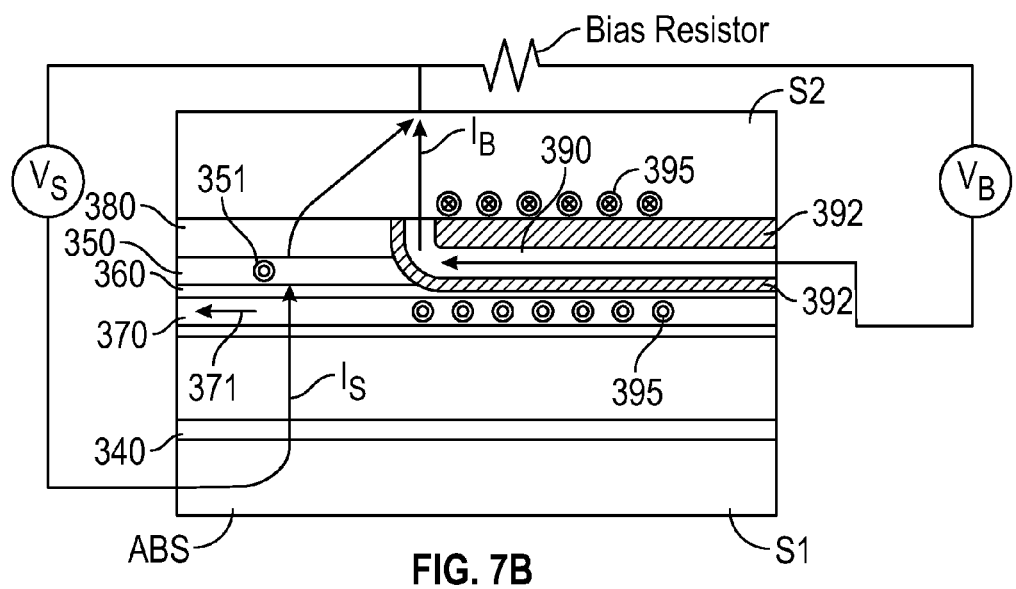
FIG. 7B is a sectional view along the plane 7B-7B in FIG. 7A and shows the ABS as a plane normal to the paper.
Figure 7C:
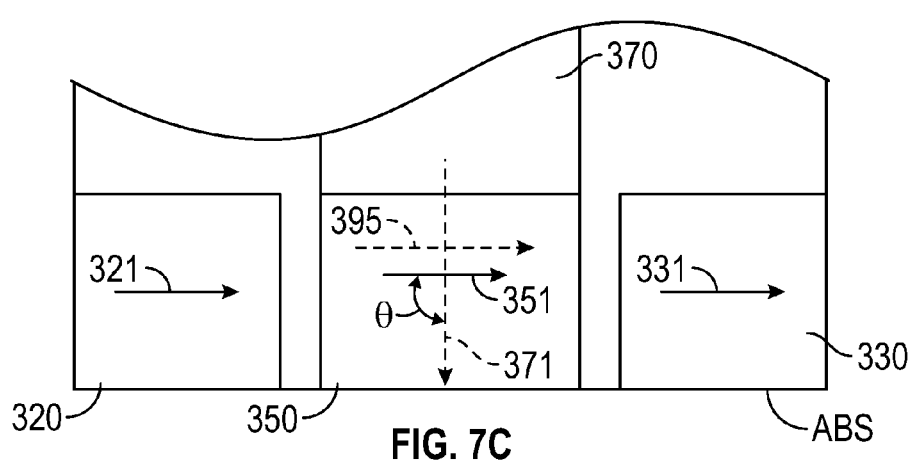
FIG. 7C is a view along the plane 7C-7C in FIG. 7A with the ABS as a plane normal to the paper and shows the track-width (TW) and stripe height (SH) dimensions of the sensor.

FIGS. 7A-7C are views of a conventional CPP GMR or TMR read head in an embodiment of the invention. FIG. 7A is an enlarged sectional view facing the ABS. The sensor comprises a stack of layers formed between the two magnetic shield layers S1, S2. S1 and S2 are typically electroplated NiFe alloy films. The sensor layers are a seed layer 340, an antiferromagnetic layer 345 for pinning the magnetization 371 of pinned or reference layer 370 substantially orthogonal to the ABS, the reference layer 370, the nonmagnetic spacer layer 360, the free ferromagnetic layer 350 with magnetization 351 substantially parallel to the ABS in the quiescent state, and capping layer 380. Longitudinal biasing layers 320, 330 with magnetizations 321, 331, respectively, are separated by insulating material at the side edges of free layer 350 and bias the free layer's magnetization 351 to be substantially parallel to the ABS and orthogonal to the magnetization 371 of reference layer 370. Free layer 350 and reference layer 370 are typically formed of conventional ferromagnetic materials like crystalline CoFe or NiFe alloys, or a multilayer of these materials, such as a CoFe/NiFe bilayer, or Heusler alloys.

While the magnetic moments 351, 371 in the quiescent state are preferably oriented generally orthogonal, i.e., between about 70 and 90 degrees to each other, they may be oriented by less than generally orthogonal, depending on the bias point at which the sensor is operated. Free layer 350 and reference layer 370 are separated by a nonmagnetic spacer layer 360. Spacer layer 360 is a nonmagnetic electrically conductive metal or metal alloy, like Cu, Au, Ag, Ru, Rh, Cr and their alloys, if the sensor is a CPP GMR sensor, and a nonmagnetic insulating material, like $TiO_2$, MgO or $Al_2O_3$, if the sensor is a CPP TMR sensor.

FIG. 7B is a sectional view along the plane 7B-7B in FIG. 7A and shows the ABS as a plane normal to the paper. FIG. 7C is a view along the plane 7C-7C in FIG. 7A with the ABS as a plane normal to the paper and shows the trackwidth (TW) and stripe height (SH) dimensions of the sensor. FIG. 7C shows the in-plane generally orthogonal relative orientation of magnetizations 351, 371, with magnetization 371 being depicted as a dashed arrow because it is the magnetization of underlying reference layer 370. In the absence of an applied magnetic field, the magnetizations 351, 371 are orthogonal (angle θ=90 deg.) to one another. However, in the presence of an applied field from recorded data on the disk, the magnetization 371 of reference layer 370 does not rotate but is fixed, while the magnetization 351 of free layer 350 rotates relative to the fixed magnetization 371, changing the angle θ. Thus when a sense current $I_S$ is applied from top shield S2 perpendicularly through the sensor stack to bottom shield S1, the magnetic fields from the recorded data on the disk will cause rotation of the magnetization 351, which is detectable as a change in electrical resistance.

FIG. 7B shows electrically conductive lead layer 390 formed behind the free layer 350 and above reference layer 370. Lead layer 390 may be formed of Cu and is electrically isolated from free layer 350 and reference layer 370 by insulating material 392 and from shield S2 by insulating material 393. Layers 392, 393 may be formed of alumina, for example. FIG. 7B shows the sensing circuitry connected between the sensor and the sense voltage source $V_S$. The sense current $I_S$ passes perpendicularly between S2 and S1 perpendicularly through the layers in the sensor stack. The applied magnetic fields from recorded data on the disk changes the angle θ, which the sensing circuitry in the preamp detects as changes in electrical resistance. FIG. 7B also shows the biasing circuitry connected between the sensor and the bias voltage source $V_B$. The biasing circuitry is connected to electrical lead layer 390 and includes a bias resistor, preferably formed on the trailing surface of the slider. The bias current $I_B$ is directed through lead layer 390 and S2 in a direction substantially orthogonal to the ABS and parallel to the magnetization 371 of reference layer 370. The bias current thus generates a bias-adjusting magnetic field 395, as shown in FIGS. 7A-7C. As depicted schematically in FIG. 7C the bias-adjusting field 395 thus acts on magnetization 371 to rotate it slightly away from being orthogonal to the ABS. This results in an adjustment of the angle θ in the quiescent state, and thus the sensitivity of the sensor.

The example illustrated in FIGS. 7A-7C is for a conventional TMR sensor with TW=16 nm, SH=16 nm, a S1-S2 spacing of 11 nm, and a 0.3 micron long electrical lead layer 390 of 8 nm thick Cu spaced between 3 nm thick layers 392 of alumina. The typical resistance across the sensor stack is about 500Ω and the resistance of the bias resistor in the biasing circuitry is about 5000Ω The electrical lead layer has a resistance of about 50Ω The nominal value of $V_S$ is about 100 mV and the difference ($V_B$–$V_S$) is about +/–1 V. The bias current $I_B$ is about +/–200 µA, which results in a bias-adjusting field (395 in FIG. 5C) range of about +/–750 Oe. The bias-adjusting field 395 provides a field of about +/–750 Oe that acts orthogonal to the reference layers' magnetization 371, which provides a field of about 2 kOe.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed:

1. A magnetoresistive sensing system comprising:
   a scissoring-type current-perpendicular-to-the-plane (CPP) magnetoresistive (MR) sensor comprising:
     a first ferromagnetic layer having an in-plane magnetization in the absence of an applied magnetic field;
     a second ferromagnetic layer having an in-plane magnetization oriented at a non-zero angle to the magnetization of said first layer in the absence of an applied magnetic field; and
     a nonmagnetic spacer layer between the first and second layers;
   sensing electrical circuitry coupled to the sensor for detecting changes in electrical resistance across the first and second layers and the nonmagnetic spacer layer in response to applied magnetic fields; and
   biasing electrical circuitry coupled to the sensor for generating a bias-adjusting magnetic field to adjust the angle between the magnetizations of the first and second layers in the absence of an applied magnetic field;
   wherein the first ferromagnetic layer is a first free ferromagnetic layer (FL1) whose magnetization is free to rotate in the presence of an applied magnetic field and the second ferromagnetic layer is a second free ferromagnetic layer (FL2) whose magnetization is free to rotate in the presence of an applied magnetic field, and wherein the scissoring-type sensor further comprises a transverse bias ferromagnetic layer for generating a transverse magnetic field to bias the magnetizations of FL1 and FL2 to make a non-zero angle relative to one another in the absence of an applied magnetic field.

2. The system of claim 1 wherein the biasing electrical circuitry is adapted to generate a bias current substantially orthogonal to the transverse magnetic field to thereby generate a bias-adjusting magnetic field substantially parallel to the transverse field in the absence of an applied magnetic field.

3. The system according to claim 1 wherein the biasing circuitry includes a biasing resistor.

4. The system according to claim 1 further comprising a preamplifier connected to the sensor, the preamplifier including an adjustable sense voltage source coupled to the sensing circuitry and an adjustable bias voltage source coupled to the biasing circuitry.

5. The system of claim 1 wherein the sensor is a giant magnetoresistance (GMR) sensor and the nonmagnetic spacer layer is formed of an electrically conductive metal or metal alloy.

6. The system of claim 1 wherein the sensor is a tunneling magnetoresistance (TMR) sensor and the nonmagnetic spacer layer is formed of an electrically insulating material.

7. A magnetoresistive sensing system for reading magnetically recorded data on a magnetic recording disk in a disk drive, the system comprising:
   an air-bearing slider having an air-bearing surface (ABS) for facing the disk and a trailing surface generally orthogonal to the ABS;
   a scissoring-type current-perpendicular-to-the-plane magnetoresistive sensor on the trailing surface of the slider comprising:
     a first free ferromagnetic layer (FL1);
     a second free ferromagnetic layer (FL2);
     a nonmagnetic spacer layer between FL1 and FL2;
     a first longitudinal ferromagnetic biasing layer having a magnetization substantially parallel to the ABS for biasing the magnetization of FL1 in a first direction in the absence of an applied magnetic field;
     a second longitudinal ferromagnetic biasing layer having a magnetization substantially parallel to the ABS and substantially opposite the magnetization of the first longitudinal biasing layer for biasing the magnetization of FL2 in a second direction in the absence of an applied magnetic field; and
     a transverse ferromagnetic biasing layer recessed from the ABS for biasing the magnetizations of FL1 and FL2 to make a non-zero angle relative to one another in the absence of an applied magnetic field;
   biasing electrical circuitry coupled to the sensor for generating a transverse bias-adjusting magnetic field substantially orthogonal to the ABS for adjusting the angle between the magnetizations of FL1 and FL2 in the absence of an applied magnetic field; and
   sensing electrical circuitry coupled to the sensor for detecting changes in electrical resistance across FL1, the nonmagnetic spacer layer and FL2 in response to applied magnetic fields from recorded data on the disk.

8. The system according to claim 7 further comprising a first magnetic shield (S1) on the trailing surface of the slider, wherein FL1, FL2 and the nonmagnetic spacer layer are located on S1, a second magnetic shield (S2) on FL2, and an electrical lead between S1 and S2 connected to the first and second longitudinal biasing layers, whereby electrical current from said biasing circuitry is directed substantially parallel to the ABS.

9. The system according to claim 8 wherein the electrical lead is located between FL2 and S2.

10. The system according to claim 7 wherein the biasing electrical circuitry includes a biasing resistor and an adjustable bias voltage source.

11. A magnetoresistive sensing system for reading magnetically recorded data on a magnetic recording disk in a disk drive, the system comprising:
   an air-bearing slider having an air-bearing surface (ABS) for facing the disk and a trailing surface generally orthogonal to the ABS;
   a scissoring-type current-perpendicular-to-the-plane (CPP) magnetoresistive sensor on the trailing surface of the slider comprising:
      a first free ferromagnetic layer (FL1);
      a second free ferromagnetic layer (FL2);
      a nonmagnetic spacer layer between FL1 and FL2;
      a first longitudinal ferromagnetic biasing layer having a magnetization substantially parallel to the ABS for biasing the magnetization of FL1 in a first direction in the absence of an applied magnetic field;
      a second longitudinal ferromagnetic biasing layer having a magnetization substantially parallel to the ABS and substantially opposite the magnetization of the first longitudinal biasing layer for biasing the magnetization of FL2 in a second direction in the absence of an applied magnetic field; and
      a transverse ferromagnetic biasing layer recessed from the ABS for biasing the magnetizations of FL1 and FL2 to make a non-zero angle relative to one another in the absence of an applied magnetic field;
   a preamplifier connected to the sensor, the preamplifier comprising:
      an adjustable sense voltage source for generating a sense current perpendicularly through FL1, the nonmagnetic spacer layer and FL2;
      an adjustable bias voltage source for generating a biasing current substantially parallel to the ABS to generate a bias-adjusting transverse magnetic field to adjust the angle between the magnetizations of FL1 and FL2 in the absence of an applied magnetic field; and
      a register for storing digital values representative of sense voltage and bias voltage; and
   a biasing electrical resistor on the slider and coupled to the bias voltage source.

12. The system of claim 11 wherein the preamplifier is adapted for connection to a disk drive system-on-a-chip (SOC) by a transmission line that includes a serial logic path, and wherein the register is adapted to receive, from the SOC on the serial logic path, the digital sense voltage and bias voltage values.

13. The system of claim 11 further comprising a first magnetic shield (S1) on the trailing surface of the slider, wherein FL1, FL2 and the nonmagnetic spacer layer are located on S1, a second magnetic shield (S2) on FL2, and an electrical lead between S1 and S2 connected to the first and second longitudinal biasing layers, whereby electrical current from said biasing voltage source is directed substantially parallel to the ABS.

14. The system of claim 13 wherein the electrical lead is located between FL2 and S2.

15. The system of claim 11 wherein the first and second longitudinal biasing layers are formed of soft ferromagnetic material and are exchange coupled across an antiferromagnetic coupling layer.

16. The system of claim 11 wherein the sensor is a giant magnetoresistance (GMR) sensor and the nonmagnetic spacer layer is formed of an electrically conductive metal or metal alloy.

17. The system of claim 11 wherein the sensor is a tunneling magnetoresistance (TMR) sensor and the nonmagnetic spacer layer is formed of an electrically insulating material.

* * * * *